Jan. 6, 1959   C. F. SCHWAN   2,867,738
INDUCTION FREQUENCY CHANGER
Filed Jan. 31, 1956
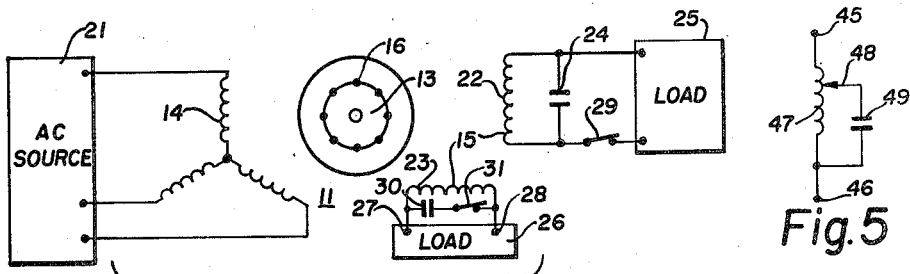
Fig.1
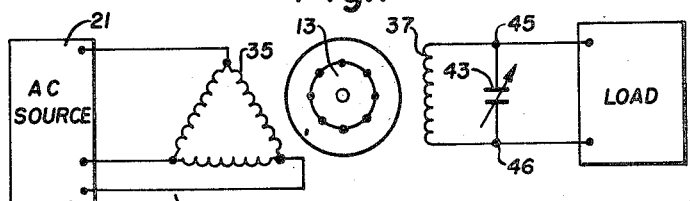
Fig.2
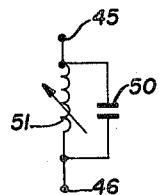
Fig.5
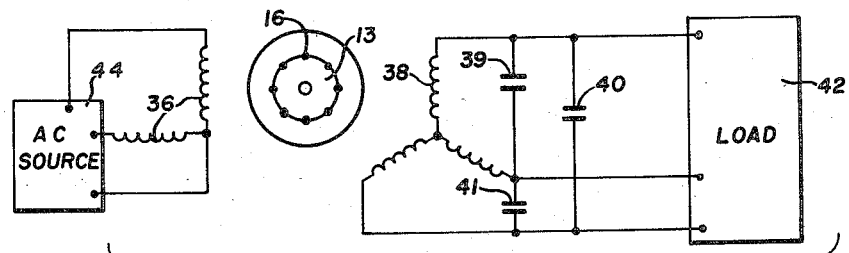
Fig.3
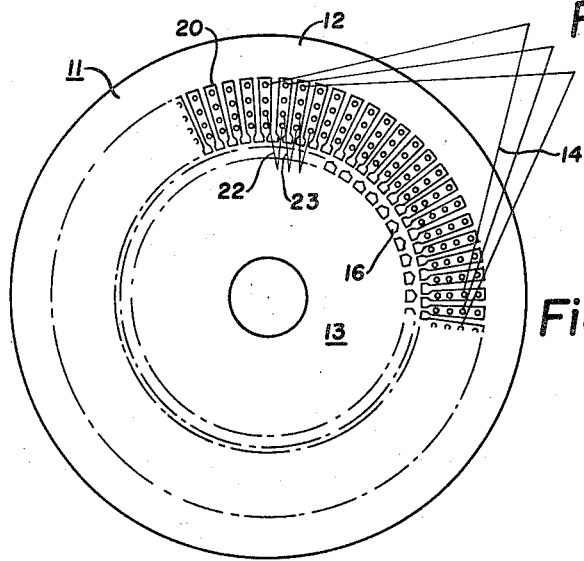
Fig.4
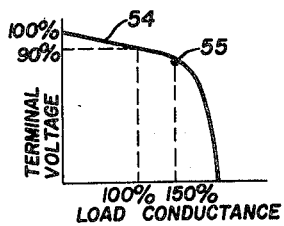
Fig.6
Fig.7
INVENTOR.
CLARENCE F. SCHWAN
BY Woodling and Krost,
atty.

United States Patent Office 2,867,738
Patented Jan. 6, 1959

2,867,738

INDUCTION FREQUENCY CHANGER

Clarence F. Schwan, Warrensville Heights, Ohio, assignor to The Reliance Electric & Engineering Company, a corporation of Ohio Application January 31, 1956, Serial No. 562,452

15 Claims. (Cl. 310—160)

The invitation relates in general to rotating frequency changers and more particularly to an induction frequency changer incorporating a rotating winding which performs a double duty function. Induction frequency changers have been known in the prior art which utilized a machine of the induction motor type with a wound rotor which was mechanically driven either backward or forward so that the slip may be of any value, even greater than one hundred percent; and thus, the output frequency of the machine is a function of speed and supply frequency.

It is also known that if an induction motor is mechanically driven at above synchronous speed it will return power to the alternating current supply lines. This is an induction generator principle and in this case the alternating current supply lines supply to the induction generator the magnetizing current.

Other forms of rotary frequency changers have been some form of motive power means, either a synchronous motor or an induction motor, driving a generator which has stator windings of a large number of poles to generate a higher frequency output voltage than the power supplied to the motive power source. Most of these prior art forms of frequency changers require two rotors, one rotor in the motive power source and another rotor in the generating machine.

Accordingly, it is an object of the invention to provide an induction frequency changer utilizing only a single rotor for both the motor action and generator action.

Another object of the invention is to provide an induction frequency changer utilizing a single rotor with a single winding thereon to act both as the motive source to drive the machine and act as the rotating member of the generator to generate output frequency voltage of either higher or lower frequency than the input voltage to the machine.

Another object of the invention is to provide a simple rotating frequency changer having no commutator, slip rings, or brushes.

Another object of the invention is to provide a frequency changer having an output voltage which may be simply regulated in magnitude by variation of a capacitive reactance connected to the output terminals.

Another object of the invention is to provide a frequency changer which has a self-limiting of current feature so as to be self-protecting in that the sustained short circuit current will be zero and there is a definite cut-off point of output voltage as the load increases to thus protect the frequency changer.

Another object of the invention is to provide a rotary frequency changer which is light in weight per power output compared to prior art forms of frequency changers.

Another object of the invention is to provide an induction frequency changer utilizing an induction generator principle wherein the magnetizing current for the generating windings are supplied by capacitive means connected to these windings.

Another object of the invention is to provide a rotary frequency changer having a stator winding cooperating with a rotor having a squirrel cage winding to drive the rotor which in turn cooperates with a second stator winding of a larger or smaller number of poles to generate a higher or lower frequency output voltage by induction generator action.

Another object of the invention is to provide an induction frequency changer of a simple, rugged, trouble-free, and light weight design.

Other objects and a fuller understanding of this invention may be had by referring to the following description and claims, taken in conjunction with the accompanying drawing, in which:

Figure 1 is a schematic diagram of an induction frequency changer having two stator windings and a squirrel cage rotor winding and incorporating the present invention;

Figure 2 is a schematic diagram of another arrangement of stator windings;

Figure 3 is a schematic diagram of a still further modification of stator windings;

Figure 4 is a section through the stator and rotor of the induction frequency changer partially showing the slot and winding arrangements;

Figures 5 and 6 are diagrams of different forms of variable capacitive reactance; and Figure 7 is a graph of output voltage versus load conductance.

The most usual power frequency in the United States is 60 cycle voltage with some 50 cycle and 25 cycle power being used. Increasingly higher frequencies are desired for many applications; 180 cycle, 400 cycle, and 1000 cycle power is in many cases advantageously used for high speed machinery such as textile machines, fluorescent lighting applications, high speed, light weight portable tools, and induction heating of metals. In many of these applications an exact frequency is not required; and therefore, induction generators with slight variation in output frequency, for example, two or three percent, are fully satisfactory.

The invention relates to an induction frequency changer of simple, rugged, trouble-free, and light weight design which will have an output voltage frequency different from that of the input voltage. In many cases the output frequency will be higher than the input frequency, and the Figures 1 and 4 show one such embodiment. The induction frequency changer 11 includes generally a stator 12 and a rotor 13 as shown in Figure 4, and the preferred embodiment is schematically shown in Figure 1 wherein the stator 12 includes a first stator winding 14 and a second stator winding 15. The rotor includes a short circuited squirrel cage winding 16 which may be similar to the conventional squirrel cage winding in an induction motor. The stator 12 has been provided with seventy-two slots 20 in which are disposed four coil sides. The first stator winding 14, as shown in Figure 1, is wound as a three-phase two-pole winding. As such, it may be laid in slots 1 and 19, for example, for the first phase, with the second and third phases being displaced 120 and 240 degrees, respectively. Thus, this first stator winding 14 will establish two coil sides per stator slot. This first stator winding 14 is adapted to be energized from a three-phase source 21 and will create a rotating magnetic field at the incoming frequency which, if it is 60 cycle, will be a field rotating at 3600 R. P. M., if wound for two poles.

The rotor 13 with its squirrel cage winding 16 will then be capable of operating as an induction motor at a speed equal to 3600 R. P. M. minus the slip frequency of the motor, and hence at a speed in the neighborhood of 3450 R. P. M.

The second stator winding 15 is wound as a two-phase thirty-six-pole winding, with first and second coils 22 and 23, respectively, and thus the coil sides thereof will fill the other half of the stator slots. The coil sides of the first coil 22 of the stator winding 15 may lie in slots 1 and 2, the coil sides of the second coil 23 of the winding 15 may lie in slots 2 and 3, and so repeating around the stator 12. This particular pitch and winding arrangement of the stator windings 14 and 15 is only illustrative and not a limitation on the scope of the invention.

A capacitor 24 is connected across the coil 22 of the stator winding 15, and a load 25 is connected to the coil 22 through a switch 29. A load 26 is connected to the coil 23 of the stator winding 15, and a capacitor 30 is also connected to the coil 23 through a switch 31. The capacitors 24 and 30 supply the magnetizing current to the multi-pole stator winding 15, and this stator winding 15 acts as a secondary to the squirrel cage winding 16 which acts as a primary in induction generator action to generate a high frequency voltage at the output terminals 27 and 28 of the stator winding 15. This action of the high frequency revolving magnetic field is similar to the action explained by the cross-field theory of a single-phase induction motor. The values of the capacitors 24 and 30 are selected to generally resonate with the inductance of the coils 22 and 23 and thus to supply the magnetizing current necessary for the induction generator action. The frequency of the output voltage at the winding 15 will be roughly the input frequency multiplied by the ratio of poles on the second stator winding 15 to the poles on the first stator winding 14. Since the second stator winding 15 has been illustrated as being a thirty-six-pole winding and winding 14 as a two-pole winding, the output frequency will be roughly eighteen times the input frequency of 60 cycle, or 1080 cycles per second. Actually the output frequency will be less than this by the slip frequency of the motor action and by the slip frequency of the generator action. Another way of describing the output frequency is that it will be dependent upon the rotor speed, for example, 3450 R. P. M., dependent upon the number of poles in the second stator winding 15 and dependent upon the slip frequency between the squirrel cage winding 16 and the second stator winding 15. In practice this output frequency may be in the neighborhood of 980 to 1000 cycles for the ratio of number of poles given in the illustration.

The induction frequency changer 11 thus by induction and without any brushes and attendant commutator or slip rings achieves a change of frequency, either increased or decreased frequency, by utilizing a rotating squirrel cage winding 16 which performs two functions. These two functions are the motor action to provide rotation to the rotor 13 and the generator action to provide the generation of the higher frequency or at least a different frequency in the second stator winding 15.

The circuit of Figure 1 has an alternative method of operation in that the circuit is operative even though the switches 29 and 31 are opened. With such a condition load 25 and capacitor 30 are disconnected from the circuit, and the capacitor 24 would then be selected in value to generally resonate with the inductive reactance of the coil 23 so as to supply the magnetizing current for the secondary winding 15. The switches 29 and 31 thus show an alternative circuit arrangement and show that it is not absolutely necessary that the capacitor 24 or any capacitive reactance be physically connected to the coil of the stator winding 15 to which the load is connected.

The input or first stator winding may be of any desired form and Figure 2 shows that the first stator winding 35 may be a three-phase delta connection winding, and Figure 3 shows that this first stator winding may be a two-phase winding 36. It also obviously could be a single-phase winding if some means of starting the rotor is provided. The first winding 36 in Figure 3 could be supplied from a suitable two-phase source 44.

The winding on the rotor has as one of its functions the development of torque as in any induction motor and thus may be a wound rotor secondary winding, if desired, which would give the advantage of being able to introduce auxiliary resistance for increased starting torque; however, the use of the squirrel cage winding 16 as shown has the advantage of elimination of any brushes in the entire induction frequency changer which thus makes a simple, rugged, and reliable dynamoelectric machine.

The first stator winding has been described as a two-pole winding, and this would be desirable where the frequency would be raised a large amount in order to keep to a minimum the number of poles required on the second stator winding. As an alternative, four or six poles, or any number of poles, may be used on the first stator winding connected to the alternating current source, depending on the ratio of desired input to output frequency and depending on whether higher or lower output frequency than input frequency is desired. The second stator winding has been shown in Figure 1 as a two-phase winding; however, it may be a single-phase winding 37 as shown in Figure 2, or may be a three-phase winding 38 as shown in Figure 3. The three-phase winding in Figure 3 has been shown as connected to capacitors 39, 40, and 41, and connected to a three-phase load 42. These capacitors supply the magnetizing current to establish the high frequency rotating field. The second stator winding 38 may be wound with any number of poles, for example, a fourteen-pole winding, with these capacitors selected to generally resonate with the second stator winding 38 and thus establish the high frequency rotating magnetic field in the order to 400 cycles for a 60 cycle input to a two-pole winding. The squirrel cage winding 16 will thus cooperate with this high frequency rotating magnetic field to establish in the second stator winding 38 the high frequency output voltage to the load 42 which will be, for the present example, a 420 cycle output minus the motor and generator action slip frequencies.

The capacitors connected to the second stator winding need not be fixed or stepless; and as an illustration, a capacitor 43 is shown in Figure 2 as connected to terminals 45 and 46, and is a variable capacitor; and by varying the capacitive reactance the output voltage of the second stator winding may be varied. The capacitor 43 has been shown as being variable, and any form of a variable capacitive reactance is usable whether manually or automatically variable. The variation of the capacitive reactance adjusts the tuning of the secondary 37, and this varies the output voltage through a wide range. As much as two to one variation in voltage is easily obtainable, and this is another important feature of the invention because it provides a ready and simple means for quickly varying the magnitude of the output voltage. This variation of capacitive reactance to vary the output voltage may be applied to any of the circuit arrangements of Figures 1, 2, and 3 and has been shown in Figure 2 only for purposes of illustration.

The Figure 5 shows another form of capacitive reactance which may be connected to the terminals 45 and 46, for example. In this case an auto transformer 47 has a variable tap 48, and a fixed capacitor 49 is connected between the terminal 46 and the variable tap 48. Thus, even though the capacitor 49 is not variable, the entire combination of the auto transformer 47 and fixed capacitor 49 is a variable capacitive reactance which can supply the magnetizing current to the secondary 37 or to any of the other secondaries 15 or 38. The Figure 6 shows still another form of variable capacitive reactance by having a fixed condenser 50 connected in parallel with any form of variable inductance 51.

The capacitors connected to the second stator winding are illustrative of one means of supplying magnetizing or excitation current to this second stator winding, and an alternative means for supplying this magnetizing current would be to operate the frequency changer in parallel with a synchronous machine which would have the leading kv.-a. necessary to supply the magnetizing current.

One advantage of the induction frequency changer is that it is self-protective. Figure 7 shows a graph 54 of output voltage versus load conductance. The machine can be designed to have a no-load to full-load regulation of approximately 10 percent which will be essentially linear out to the 150 percent load point at 55. The output current drops rapidly to zero beyond this point so that if a conductance of 200 percent of that for rated current is suddenly applied to the frequency changer, the output voltage will decay to zero. The decay time is fairly short; being in the order of 1 to 2 seconds after the application of the excessive load. Since there is no excitation to the machine after the maximum conductance value is exceeded, the short circuit current is zero. This is to be contrasted with a normal alternator characteristic in which the short current is of the order of 5 to 10 times rated current.

This characteristic of the frequency changer offers some advantages. The voltage of the frequency changer can be removed from the load by short circuiting the load rather than opening the circuit as would normally be the case. The frequency changer eliminates the necessity of expensive circuit protective devices since it inherently protects itself. The danger of overloads is thereby reduced.

The dual function of the squirrel cage winding 16 and the rotor 13, plus the dual function of the iron in the stator 12 in carrying both high and low frequency rotating magnetic fields, provides a frequency changer which is low in weight for its power output compared to existing known forms of frequency changers. Only a single stator and a single rotor are required rather than the two rotors and two stators as in the conventional motor-generator set. The input winding or the first stator winding has been shown on the stator 12, whereas the secondary of the induction motor has been shown on the rotor 13. If desired, this may be inverted with the input winding on the rotor and the secondary winding of the induction motor portion on the stator. In this case the output or generator winding would need to be on the rotor 13.

The iron or magnetic members in the rotor and the stator provide a magnetic circuit for the low frequency flux to link the first stator winding 14 and the squirrel cage winding 16, and these same magnetic members also provide a magnetic circuit so that the high frequency flux may link the squirrel cage winding 16 and the second stator winding 15. This illustrates the dual function of both the rotor and the stator as well as the dual function of the squirrel cage winding 16.

The rotor has a smooth outer cylindrical surface and the number of conductor bars on the rotor which determine the number of magnetic portions between such conductor bars has no effect on the output frequency. The magnetic portions between the conductor bars on the rotor might possibly be considered to be magnetic teeth on the rotor, yet the number of any such magnetic teeth again does not affect the output frequency of the second stator winding. The output frequency is dependent only on the ratio of poles of the two stator windings and the motor and generator action slip frequencies.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. An induction rotary frequency changer, comprising, a first winding having a first number of poles, a second short circuited winding inductively coupled to said first winding, magnetic means to complete a magnetic circuit for each of said poles through said first and second windings, means for energizing said first winding for providing rotation to one of said windings on an induction motor principle, a third winding having a second number of poles and having output terminals, means connecting said output terminals to capacitive means, means including said magnetic means to complete a magnetic circuit for each of said second number of poles through said second and third windings for inductive generator action upon rotation of said one of said windings for producing an output voltage at said terminals at a frequency independent of any teeth on said magnetic means and equal to the frequency applied to said first winding minus the motor and generator action slip frequencies multiplied by the quotient of the second number of poles divided by the first number of poles.

2. A frequency changer, comprising, a stator, a first winding on said stator having a first number of pairs of poles, a short circuited second winding rotatable relative to said stator, means to complete a magnetic circuit for each of said poles through said stator and threading said short circuited winding, means for energizing said first winding for running said rotor as a motor at a predetermined speed, a third winding on said stator having output terminals, means connecting said output terminals to capacitive means, said third winding having a second number of pairs of poles and cooperating with the rotating short circuited winding for inductive generator action in producing an output voltage at said terminals at a frequency independent of any teeth on said magnetic means and equal to the rotor speed in revolutions per second minus the generator action slip frequency multiplied by the second number of pairs of poles.

3. A frequency changer, comprising, a stator and a rotor rotatable therein, a first winding on one of said stator and rotor, a short circuited second winding on the other of said stator and rotor, means for energizing said first winding for running said rotor as a motor, a third winding on said one of said stator and rotor and having output terminals, means for supplying magnetizing current to said third winding, said third winding having a given number of poles and cooperating with said second winding for inductive generator action in producing an output voltage at said terminals at a frequency dependent on said given number of poles and independent of any teeth on said other of said stator and rotor.

4. A frequency changer, comprising, a stator and a rotor rotatable therein, a first winding on one of said stator and rotor, a squirrel cage winding on the other of said stator and rotor, means for energizing said first winding for running said rotor as a motor at a predetermined speed, a third winding on said one of said stator and rotor and having output terminals, means connecting said output terminals to capacitive means, said third winding having a given number of poles and cooperating with said squirrel cage winding for producing an output voltage at said terminals at a frequency dependent on the rotor speed and said given number of poles and the slip frequency of said rotor and independent of any teeth on said other of said stator and rotor.

5. An induction rotary frequency changer, comprising, a stator and a rotor rotatable therein, a first winding on one of said stator and rotor and having a first number of poles, a squirrel cage winding and a smooth cylindrical surface on the other of said stator and rotor, means for energizing said first winding for running said rotor as a motor, a third winding on said one of said stator and rotor and having output terminals, means connecting said output terminals to capacitive means, said third winding having a second number of poles and cooperating with said squirrel cage winding for inductive generator action in producing an output voltage at said terminals at a frequency equal to the frequency applied to said first winding minus the motor and generator slip frequencies multiplied by the quotient of the second number of poles divided by the first number of poles.

6. An induction rotary frequency changer, comprising, a stator and a rotor therein, a first winding on said stator having a first number of poles, a squirrel cage winding and a smooth outer cylindrical surface on said rotor, means for energizing said first winding for running said rotor as a motor, a second winding on said stator having output terminals, means connecting said output terminals to capacitive means, said second stator winding having a second number of poles and cooperating with the rotating squirrel cage winding for inductive generator action in producing an output voltage at said terminals at a frequency equal to the frequency applied to said first stator winding minus the motor and generator slip frequencies multiplied by the quotient of the second number of poles divided by the first number of poles.

7. An induction frequency changer, comprising, a stator and a rotor therein, a first winding on said stator having a first number of pairs of poles, a squirrel cage winding on said rotor, means for energizing said first winding for operating said rotor as a motor at a speed in revolutions per second equal to the applied frequency in cycles per second divided by the number of pairs of poles on said first winding minus the motor action slip frequency between said windings, a smooth outer cylindrical surface on said rotor, capacitive means, and a second winding on said stator adapted to be connected to said capacitive means and having a second number of pairs of poles and cooperating with the rotating squirrel cage winding for inductive generator action in producing an output voltage at a frequency independent of the number of any magnetic teeth on said rotor and equal to the number of pairs of poles on said second stator winding multiplied by the difference between said rotor speed in revolutions per second minus the generator action slip frequency between said squirrel cage winding and said second stator winding.

8. An induction frequency changer, comprising, a frame, a first stator winding on said frame wound as a primary winding of a first number of poles, a rotor journalled in said frame and having a squirrel cage winding thereon as a secondary for said primary winding for operating said rotor as a motor on energization of said primary winding with said rotor operable at a speed in revolutions per second equal to the applied frequency in cycles per second divided by the number of pairs of poles on said primary winding minus the motor action slip frequency between said windings, a smooth outer cylindrical surface on said rotor, capacitive means, and a second stator winding on said frame connected to said capacitive means and wound as a secondary winding having a second number of poles cooperating with the rotating squirrel cage winding as a primary winding for inductive generator action in producing an output voltage on said second stator winding at a frequency independent of the number of any magnetic teeth on said rotor and equal to the number of pairs of poles on said second stator winding multiplied by the difference between said rotor speed in revolutions per second minus the generator action slip frequency between said squirrel cage winding and said second stator winding.

9. An induction frequency changer, comprising, a frame, a first stator winding on said frame operable as a two-pole three-phase primary winding, a rotor journalled in said frame and having a squirrel cage winding thereon as a secondary for said primary winding for operating said rotor as a motor on energization of said primary winding with said rotor operable at a speed in revolutions per second equal to the applied frequency in cycles per second minus the motor action slip frequency between said windings, a smooth outer cylindrical surface on said rotor, capacitive means, and a second stator winding on said frame connected to said capacitive means and wound as a thirty-six-pole two-phase secondary winding cooperating with the rotating squirrel cage winding as a primary winding for inductive generator action in producing an output voltage on said second stator winding at a frequency independent of the number of any magnetic teeth on said rotor and equal to eighteen times the difference between said rotor speed in revolutions per second minus the generator action slip frequency between said squirrel cage winding and said second stator winding.

10. An induction frequency changer, comprising, a frame, a first stator winding on said frame operable as a two-pole three-phase primary winding, a rotor journalled in said frame and having a squirrel cage winding thereon as a secondary for said primary winding for operating said rotor as a motor on energization of said primary winding with said rotor operable at a speed in revolutions per second equal to the applied frequency in cycles per second minus the motor action slip frequency between said windings, a smooth outer cylindrical surface on said rotor, capacitive means, and a second stator winding on said frame wound as a thirty-six-pole two-phase secondary winding of first and second coils, means for connecting said first coil to said capacitive means as an exciting coil to establish a high frequency rotating magnetic field, means including said high frequency rotating magnetic field for producing an output voltage on said second coil at a frequency independent of the number of any magnetic teeth on said rotor and equal to eighteen times the difference between said rotor speed in revolutions per second minus the generator action slip frequency.

11. An induction frequency changer, comprising, a frame, a first stator winding on said frame wound as a two-pole three-phase primary winding, a rotor journalled in said frame and having a squirrel cage winding thereon as a secondary for said primary winding for operating said rotor as a motor on energization of said primary winding with said rotor operable at a speed in revolutions per second equal to the applied frequency in cycles per second minus the motor action slip frequency between said windings, a smooth outer cylindrical surface on said rotor, capacitive means and a second stator winding on said frame connected to said capacitive means and wound as a thirty-six-pole single-phase secondary winding cooperating with the rotating squirrel cage winding as a primary winding for inductive generator action in producing an output voltage on said second stator winding at a frequency independent of the number of any magnetic teeth on said rotor and equal to eighteen times the difference between said rotor speed in revolutions per second minus the generator action slip frequency between said squirrel cage winding and said second stator winding.

12. An induction frequency changer, comprising, a frame, a first stator winding on said frame wound as a two-pole two-phase primary winding, a rotor journalled in said frame and having a squirrel cage winding thereon as a secondary for said primary winding for operating said rotor as a motor on energization of said primary winding with said rotor operable at a speed in revolutions per second equal to the applied frequency in cycles per second minus the motor action slip frequency between said windings, a smooth outer cylindrical surface on said rotor, capacitive means, and a second stator winding on said frame connected to said capacitive means and wound as a thirty-six-pole three-phase secondary winding cooperating with the rotating squirrel cage winding as a primary winding for inductive generator action in producing an output voltage on said second stator winding at a frequency independent of the number of any magnetic teeth on said rotor and equal to eighteen times the difference between said rotor speed in revolutions per second minus the generator action slip frequency between said squirrel cage winding and said second stator winding.

13. A frequency changer, comprising, a stator, a first winding on said stator having a first number of pairs of poles, a short circuited second winding rotatable relative to said stator, means to complete a magnetic circuit for each of said poles through said stator and threading said short circuited winding, means for energizing said first winding for running said rotor as a motor at a predetermined speed, a third winding on said stator having output terminals, means for connecting said output terminals to capacitive reactance means, said third winding having a second number of pairs of poles and cooperating with the rotating short circuited winding for inductive generator action in producing an output voltage at said terminals at a frequency equal to the rotor speed in revolutions per second minus the generator action slip frequency multiplied by the second number of pairs of poles, and means for varying the value of said capacitive reactance means to vary the magnitude of the output voltage.

14. A frequency changer, comprising, a stator, a first winding on said stator, a second winding rotatable relative to said stator, means to complete a magnetic circuit for each of said poles through said stator and threading said second winding, means for energizing said first winding for running said rotor as a motor at a predetermined speed, third winding means on said stator having output terminal means, means for connecting said output terminal means to capacitive reactance means, said third winding means cooperating with the rotating second winding for inductive generator action in producing an output voltage at said output terminal means, and means for varying the value of said capacitive reactance means to vary the magnitude of the output voltage.

15. An induction frequency changer including a stator and a rotor with conductor means thereon to pass current established only by induction, first and second windings on said stator, means for energizing said first stator winding from a supply voltage of a first frequency, means for providing effectively a different number of magnetic poles for said first and second stator windings, and means for supplying a magnetizing current to said second stator winding to cause it to act as an output winding with energy being conveyed across the air gap from the first stator winding to the rotor to run the rotor by motor action and to reconvey energy across the air gap from the rotor to the second stator winding to inductively generate therein an output voltage of a frequency different from the frequency of the voltage applied to the first stator winding, whereby a short circuit on said second stator winding removes the effect of said magnetizing current to cause the sustained short circuit current on the second stator winding to be zero to thus provide a self-limiting feature of protection to the induction frequency changer.

References Cited in the file of this patent
UNITED STATES PATENTS

| | | |
|---|---|---|
| 715,545 | Bradley | Dec. 9, 1902 |
| 910,638 | Bradley | Jan. 26, 1909 |
| 2,253,966 | Baumann | Aug. 26, 1941 |
| 2,761,081 | Clark | Aug. 28, 1956 |